(12) United States Patent
Ye

(10) Patent No.: US 9,193,109 B2
(45) Date of Patent: Nov. 24, 2015

(54) METHOD AND DEVICE FOR PACKAGING BY HEAT SEALING

(76) Inventor: Chunlin Ye, Yiwu (CN)

( * ) Notice: Subject to any disclaimer, the term of this patent is extended or adjusted under 35 U.S.C. 154(b) by 633 days.

(21) Appl. No.: 13/548,178

(22) Filed: Jul. 12, 2012

(65) Prior Publication Data

US 2012/0277083 A1 Nov. 1, 2012

Related U.S. Application Data

(63) Continuation-in-part of application No. PCT/CN2011/070255, filed on Jan. 14, 2011.

(30) Foreign Application Priority Data

Apr. 9, 2010 (CN) .......................... 2010 1 0142151

(51) Int. Cl.
| | |
|---|---|
| B29C 65/02 | (2006.01) |
| B32B 37/04 | (2006.01) |
| B32B 37/06 | (2006.01) |
| B32B 38/04 | (2006.01) |
| B29C 65/00 | (2006.01) |
| B29C 65/04 | (2006.01) |
| B29C 65/18 | (2006.01) |
| B29C 65/74 | (2006.01) |
| B29C 65/78 | (2006.01) |
| B65B 51/14 | (2006.01) |
| B65B 51/26 | (2006.01) |

(52) U.S. Cl.
CPC ............. *B29C 66/8122* (2013.01); *B29C 65/04* (2013.01); *B29C 65/18* (2013.01); *B29C 65/743* (2013.01); *B29C 65/7841* (2013.01); *B29C 66/1122* (2013.01); *B29C 66/43* (2013.01); *B29C 66/81261* (2013.01); *B29C 66/81457* (2013.01); *B29C 66/8322* (2013.01); *B29C 66/8491* (2013.01); *B29C 66/002* (2013.01); *B29C 66/8242* (2013.01); *B65B 51/146* (2013.01); *B65B 51/26* (2013.01); *Y10T 156/1054* (2015.01); *Y10T 156/1313* (2015.01)

(58) Field of Classification Search
CPC .... B29C 65/18; B29C 65/7841; B29C 66/81; B29C 66/8122; B29C 66/81261; Y10T 156/1054; Y10T 156/1313
USPC .................................. 156/250, 251, 252, 253
See application file for complete search history.

(56) References Cited

U.S. PATENT DOCUMENTS

| 4,373,978 A * | 2/1983 | Patterson ........................ 156/69 |
| 7,174,699 B1 * | 2/2007 | Wyman et al. .................. 53/547 |

\* cited by examiner

*Primary Examiner* — Philip Tucker
*Assistant Examiner* — Christopher C Caillouet
(74) *Attorney, Agent, or Firm* — Matthias Scholl, PC; Matthias Scholl

(57) ABSTRACT

A method of packaging by heat sealing, including: a) transporting films to a heat sealing packaging station; b) pressing two layers of the films with a positioning blocking element to position the films and block the air flow between a packaging cavity and a packaging line; c) performing heat sealing to the two layers of the films at the packaging line by a heat sealing device; and d) resetting the heat sealing device and the positioning blocking element, and cooling and solidifying the films bonded at the packaging line.

5 Claims, 9 Drawing Sheets

METHOD AND DEVICE FOR PACKAGING BY HEAT SEALING

CROSS-REFERENCE TO RELATED APPLICATIONS

This application is a continuation-in-part of International Patent Application No. PCT/CN2011/070255 with an international filing date of Jan. 14, 2011, designating the United States, now pending, and further claims priority benefits to Chinese Patent Application No. 201010142151.2 filed Apr. 9, 2010. The contents of all of the aforementioned applications, including any intervening amendments thereto, are incorporated herein by reference.

CORRESPONDENCE ADDRESS

Inquiries from the public to applicants or assignees concerning this document should be directed to: MATTHIAS SCHOLL P. C., ATTN.: DR. MATTHIAS SCHOLL ESQ., 14781 MEMORIAL DRIVE, SUITE 1319, HOUSTON, Tex. 77079.

BACKGROUND OF THE INVENTION

1. Field of the Invention

The invention relates to the technical field of packaging, and more particularly to a method and device of packaging by heat sealing.

2. Description of the Related Art

At present, the method of packaging by heat sealing for plastic films has been widely used for packaging food, medicine, and cosmetics, with the advantages of low cost, high packaging efficiency, moisture resistance, seepage prevention, etc. There are several concrete application methods: (1) continuous liquid packaging, the film raw material adopts a double-layer long film packaging tape, and its two side edges are sealed. During the packaging process, the packaging tape is filled with packaging materials, and then two ends of the packaging tape are transversely sealed and cut off, so as to finish packaging; (2) single packaging, packaging materials are put into a plastic bag or a single cavity with an opening at one end, and then the opening of the plastic bag or the single cavity is sealed with a heat sealing device; (3) a concave cavity for allowing the packaging materials to be placed in is formed on at least one layer of film in two layers of films, a heat sealing cutting die of the heat sealing device is manufactured into the shape consistent with that of a required packaging line, then the two layers of films are sealed at the packaging line, the packaging method can adopt an individual packaging method or a multipack packaging method, and a packaging line is arranged between every two packaging materials, so that the packaging materials are separated from each other. The fundamental principle of the method of packaging by heat sealing is as follows: a heat sealing cutting die is arranged on the heat sealing device and has the same shape as the packaging line, the heat sealing device is used for heating the heat sealing cutting die through a heating device, the heat sealing cutting die is maintained at a set temperature, close to and pressed against the films, the films are mutually bonded after being molten by heat, the heat sealing cutting die is reset, and then the films are cooled and packaged. Although the film for packaging has no harm to human body, it is molten at a high temperature to generate a small amount of toxic decomposition gas during the packaging process, the decomposition gas enters a packaging cavity and packaged food or medicine, thus the secondary pollution to the packaging materials is caused. The prolonged intake of light polluted food or medicine may negatively affect the human health. Currently, some more advanced heat sealing machines are provided, such as a high-frequency heat sealing machine, an ultrasonic heat sealing machine and a heat sealing machine using laser technology, and the heat sealing packaging quality and the heat sealing packaging efficiency are remarkably improved, but the heat-sealed films are bonded together by melting, thus the secondary pollution to the packaging materials cannot be avoided. Even for the normally used plastic bags, the odor left in the plastic bags during the melting and decomposing process can be often smelled when the plastic bags are used in an opened manner.

For example, an upper film and a lower film are placed on a middle die seat and a lower die seat respectively, the lower film is infused with fluid, a vacuum cavity where the middle die seat and the lower die seat are positioned is closed through a valve, the gas in the vacuum cavity can be extracted through a vacuum pump unit, so as to form a state close to the vacuum, a vertically butted sealing seat formed by the middle die seat and the lower die seat is used for heat sealing, the circumferences of the upper film and the lower film are sealed at one time in the state close to the vacuum state to cause the fluid to be enveloped, and no bubbles remain in the fluid. During the packaging process, the packaging cavity is vacuumized, so as to extend the shelf life of packaging materials, but the secondary pollution of trace decomposition gas to the packaging materials cannot be avoided.

SUMMARY OF THE INVENTION

To overcome the defects in the conventional method of packaging by heat sealing that secondary pollution is easily caused to packaging materials, the invention provides a method of packaging by heat sealing for effectively preventing the decomposition gas from entering a packaging cavity, and a corresponding heat sealing device.

To achieve the above objective, in accordance with one embodiment of the invention, there is provided a method of packaging by heat sealing, comprising:

a). transporting films to a heat sealing packaging station;

b). pressing two layers of the films with a positioning blocking element to position the films and block the air flow between a packaging cavity and a packaging line;

c). performing heat sealing to the two layers of the films at the packaging line by a heat sealing device; and d). resetting the heat sealing device and the positioning blocking element, and cooling and solidifying the films bonded at the packaging line.

To prevent the decomposition gas generated by the heated films during the heat sealing packaging process from entering the packaging cavity, on the basis of the conventional method of packaging by heat sealing, a step is added, that is, before the heat sealing packaging from the heat sealing device, the two layers of films are pressed with the positioning blocking element, so that the films are reliably positioned to be favorable for heat sealing packaging, and meanwhile, the air flow between the packaging cavity and the packaging line can be completely blocked. Moreover, the positioning blocking element can be closely attached to the packaging line to avoid a gap between the packaging line and a blocking pressure mark of the positioning blocking element, and the gas generated during the decomposition of the heated film is released only from the blocked outer side surface, thus the decomposition gas generated during the melting process of the film can be effectively prevented from entering the packaging cavity to cause secondary pollution to the packaging materials.

In a class of this embodiment, compressed air are sprayed to the films to press the two layers of the films, so that the positioning blocking element in step b) performs positioning to the films and blocking to the air flow between the packaging cavity and the packaging line. The compressed air not only can be used for uniformly and effectively pressing and blocking the films, but also avoid a pressure mark generated on the surface of the film, and meanwhile, has the cooling effect, can avoid the heat transfer on two sides of the packaging line, and is further favorable for smoothing and beautifying the packaging line; or the positioning blocking element in the step b adopts a rigid body, which can adopts a single-side pressing blocking method or a two-side extrusion blocking method.

In another respect, the invention provides a heat sealing device comprising a heat sealing cutting die and a positioning blocking element, wherein the positioning blocking element employs a high-temperature resistant silicon sheet which is arranged on a side surface of the heat sealing cutting die and is linked with the heat sealing cutting die, and a lower end surface of the high-temperature resistant silicon sheet for pressing the film is higher than that of the heat sealing cutting die for heat sealing.

The high-temperature resistant silicon sheet has good elasticity and insulating property, and also can bear the heat sealing temperature of the heat sealing cutting die, because the high-temperature resistant silicon sheet linked with the heat sealing cutting die and higher than the heat sealing cutting die is arranged on the side surface of the heat sealing cutting die, the high-temperature resistant silicon sheet is in contact with the films before the heat sealing packaging of the heat sealing cutting die, the films are pressed under the action of elasticity of the high-temperature resistant silicon sheet, and the effects of positioning and blocking the film are further achieved, so as to prevent the decomposition gas generated during the heat sealing packaging process from entering the packaging cavity. The high-temperature resistant silicon sheet is linked with the heat sealing cutting die, thereby facilitating the simplification of structure and operation steps as well as the improvement of packaging efficiency.

In a class of this embodiment, a metal pressure sheet is installed on the end surface of the high-temperature resistant silicon sheet for pressing the film, so that the end surface for pressing the film has sufficient hardness to ensure the blocking effect, and meanwhile, the metal pressure sheet has better heat-dissipation effect, thus the film arranged adjacent to the packaging line can be prevented from decomposed by heat.

In a class of this embodiment, a groove used for reducing the heat transfer between the heat sealing cutting die and the high-temperature resistant silicon sheet is formed on one side of the high-temperature resistant silicon sheet adjacent to the heat sealing cutting die, and the contact area between the high-temperature resistant silicon sheet and the heat sealing cutting die can be reduced, thereby reducing the heat transfer between both and being favorable for prolonging the service life of the high-temperature resistant silicon sheet; the lower end surface of the high-temperature resistant silicon sheet is 1 mm-5 mm higher than that of the heat sealing cutting die, thereby ensuring the high-temperature resistant silicon sheet performs positioning and blocking to the film before the operation of the heat sealing cutting die, and ensuring there is enough pressure to achieve reliable blocking.

In a class of this embodiment, the positioning blocking element is arranged on two side surfaces of the heat sealing cutting die, thereby preventing the decomposition gas from entering the cavities on two sides of the packaging line, and being suitable for multipack packaging of packaging materials on both sides of the packaging line.

In accordance with another embodiment of the invention, there provided is a heat sealing device comprising a heat sealing cutting die and a positioning blocking element which is arranged on a side surface of the heat sealing cutting die, wherein the positioning blocking element employs a spray nozzle capable of spraying compressed air out, the spray nozzle is driven by a control mechanism and comprises a slit-shaped orifice, a starting position far from the film, and a blocking position close to the film.

The spray nozzle can work before the heat sealing cutting die under the control of the control mechanism, at the blocking position near to the film, the compressed air can be sprayed out at the orifice for pressing the film, and the air flow between the packaging line and the packaging cavity is blocked. In addition, using the compressed air for blocking can ensure the reliable blocking and avoid a gap between the two layers of films on the side of the packaging lines.

In a class of this embodiment, the width of the orifice of the spray nozzle is 0.05 mm-1 mm, thus not only the reliable blocking can be ensured, but also the influence to the packaging cavity can be avoided; when the spray nozzle is positioned at the blocking position, the distance between the opening end and the film is 0.5 mm-2 mm, so as to be favorable for centrally spraying the compressed air onto the film, improve the pressure to the film and avoid the reduction in temperature of the heat sealing cutting die due to the scattering of compressed air.

Advantages of the invention are summarized below: firstly, the decomposition gas is blocked during the packaging process, thereby avoiding the secondary pollution to the packaging materials; secondly, the positioning blocking element has a simple structure and is convenient to use.

DETAILED DESCRIPTION OF THE EMBODIMENTS

Example 1

Figure 1:
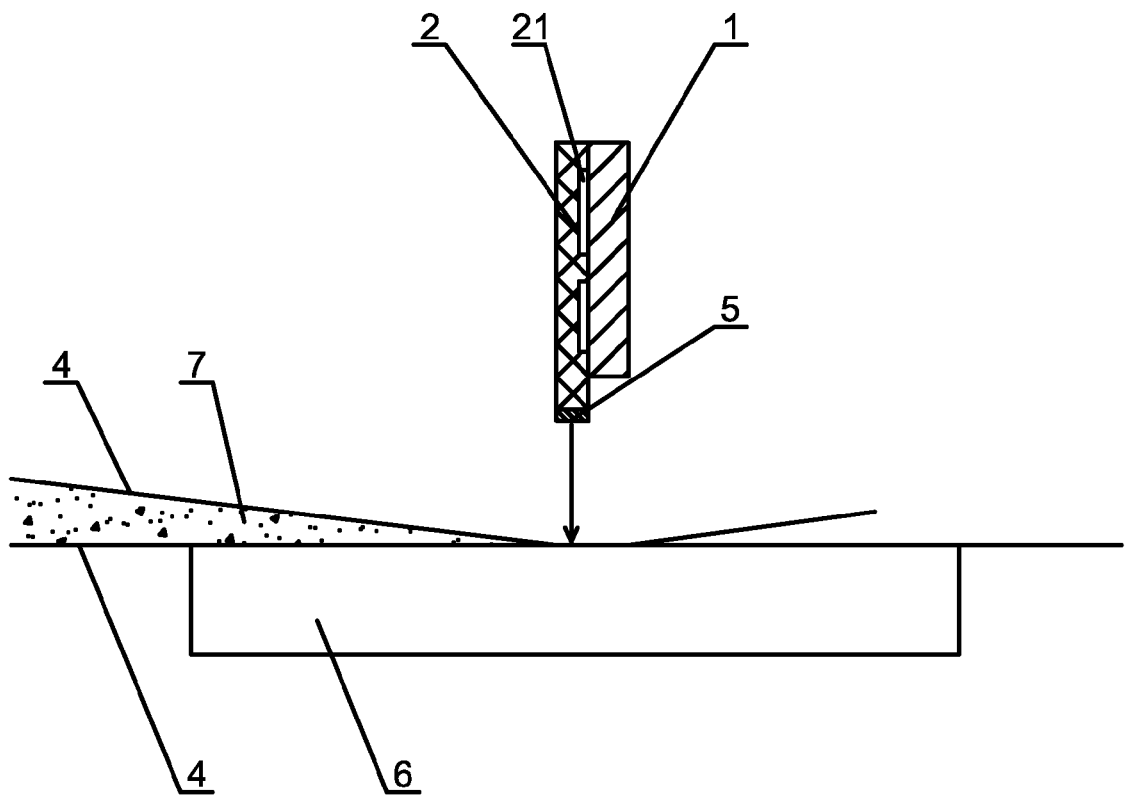
FIG. 1 is a structure diagram of a heat sealing device in accordance with one embodiment of the invention.

A method of packaging by heat sealing for plastic films, mainly used for packaging food, medicine, and cosmetics, comprises a positioning blocking step on the basis of conventional methods of packaging to prevent the decomposition gas generated during the heat sealing process of the film from entering the packaging cavity. Specifically, the method comprises: a. Transporting two layers of upper and lower films for packaging to a heat sealing packaging station through a feeding mechanism, and meanwhile, putting the packaging materials into a packaging cavity formed by the two layers of films; b. Pressing the two layers of films with a positioning blocking element, positioning the films and blocking the air flow between the packaging cavity and the packaging line; c. Performing heat sealing to the two layers of films at the packaging line by a heat sealing device; d. Resetting the heat sealing device and the positioning blocking element, and cooling and solidifying the films bonded at the packaging line, so as to finish packaging. The heat sealing device performs heat sealing to the two layers of films at the packaging line by a thermo-melt bonding method, that is, a heat sealing cutting die performs heating by an electric heating method, and the temperature is controlled through a controller; or the heat sealing device performs heat sealing to the two layers of films at the packaging line by a high-frequency heat sealing method, when the high-frequency heat sealing method is adopted, the heat sealing cutting die itself is not heated, thus the positioning blocking element closely attached to the heat sealing cutting die is not heated, and it's favorable for prolonging the service life of the positioning blocking element. The positioning blocking element can be made of a flaky elastomer or adopt an elastic expandable pressure sheet, and the films are pressed and blocked in virtue of the elastic force of compression deformation; or the films are pressed and blocked using the compressed air sprayed out through a spray nozzle on the side of the heat sealing cutting die. When the films are packaged, the two layers of films are tightly pressed along the packaging line through the positioning blocking element, thus the decomposition gas generated during the heat sealing process of the film cannot enter the packaging cavity, but volatize only from the surface of the film, and the secondary pollution of the decomposition gas to the packaging materials in the packaging cavity is avoided.

In the method of packaging by heat sealing for plastic films, a blocking step is added mainly on the basis of the conventional heat sealing packaging technology, thus besides the thermo-melt bonding method and the high-frequency heat sealing method, the method of packaging by heat sealing is also suitable for an ultrasonic heat sealing method, a laser heat sealing method and other various heat sealing methods adopting the film melt bonding principle, and correspondingly, in the positioning blocking element, besides using the previous elastic pressure sheet or compressed air, a vacuum suction nozzle can be arranged below the film or a combined method of the several methods above can be adopted.

Example 2

Figure 2:
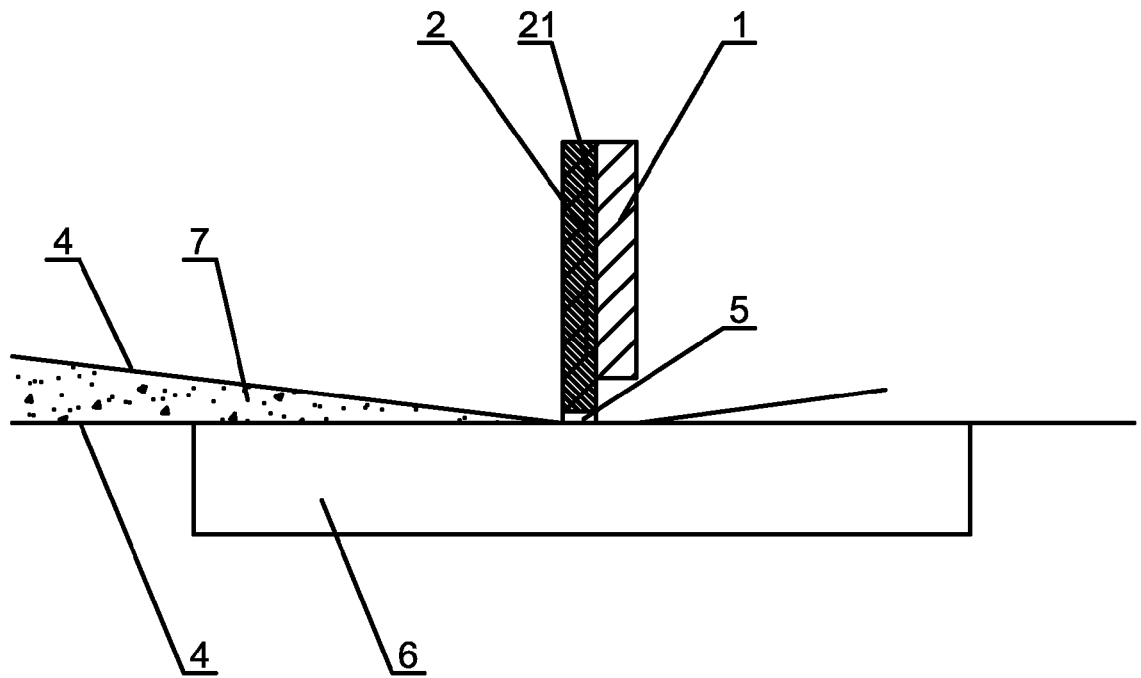
FIG. 2 is a structure diagram of contact between a positioning blocking element of a heat sealing device with a film in one embodiment.
Figure 3:
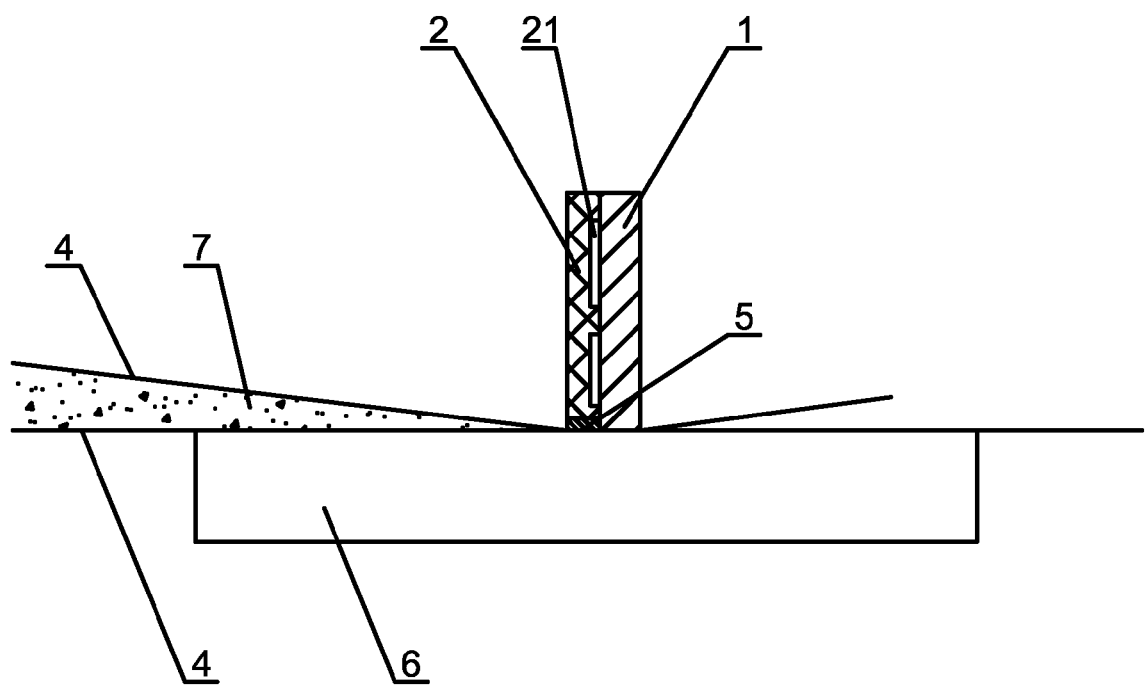
FIG. 3 is a structure diagram of a heat sealing cutting die of a heat sealing device during the heat sealing process in accordance with one embodiment of the invention.

As shown in FIG. 1, a heat sealing device employing a thermo-melt bonding method is mainly used for individual packaging. The heat sealing device comprises a heat sealing cutting die 1. A flaky positioning blocking element employs a high-temperature resistant silicon sheet 2 and is fixed on one side surface of the heat sealing cutting die 1. The thickness of the high-temperature resistant silicon sheet 2 is basically the same as that of the heat sealing cutting die. The high-temperature resistant silicon sheet 2 is closely attached to the side surface of the heat sealing cutting die, and meanwhile, grooves 21 separated from each other are formed in the middle of the side surface where the high-temperature resistant silicon sheet is stuck with the heat sealing cutting die, and the depth of each groove is about 1 mm. To ensure that films 4 are reliably pressed by the high-temperature resistant silicon sheet, the end surface of the high-temperature resistant silicon sheet for pressing the films is 3 mm higher than that of the heat sealing cutting die. A metal pressure sheet 5 with thickness of 1 mm is bonded on the end surface of the high-temperature resistant silicon sheet and can be made of stainless steel. Stainless steel not only has certain hardness and elasticity, but also has good heat-conducting property, and can avoid rust. When the heat sealing cutting die of the heat sealing device of the embodiment performs heat sealing packaging to the films, packaging materials are put in a packaging cavity 7 formed by the two layers of upper and lower films 4, the films are transported to a heat sealing station 6, at the moment, the heat sealing device works, the heat sealing cutting die is lowered and adjacent to the films, as shown in FIG. 2, the metal pressure sheet on the high-temperature resistant silicon sheet closely attached to the side surface of the heat sealing cutting die is first in contact with the films, the films are pressed and positioned in virtue of the elastic force generated during the compression deformation of the high-temperature resistant silicon sheet, the air flow between the packaging line and the packaging body is further blocked, then the heat sealing cutting die is in contact with the films (as shown in FIG. 3), the heat sealing cutting die transfers heat to the packaging line of the films, the films are mutually bonded together after being molten by heat, and the high-temperature resistant silicon sheet is closely attached to the heat sealing cutting die, so that there is no gap between the packaging line of the heat sealing cutting die and a blocking pressure mark of the high-temperature resistant silicon sheet, and the gas generated during the decomposition of the heated film is completely blocked on the side adjacent to the packaging cavity by the high-temperature resistant silicon sheet, and finally released from the surface of the film or two ends of the packaging line; because of the fast heat transfer of the metal pressure sheet made of stainless steel, the temperature at the blocking press line on the film is always lower than the decomposition temperature of the film, thus it not only can prevent the decomposition gas from entering the packaging cavity, but also is favorable for straightening and beautifying the packaging line formed after package, so as to improve the grade of the product.

Example 3

Figure 4:
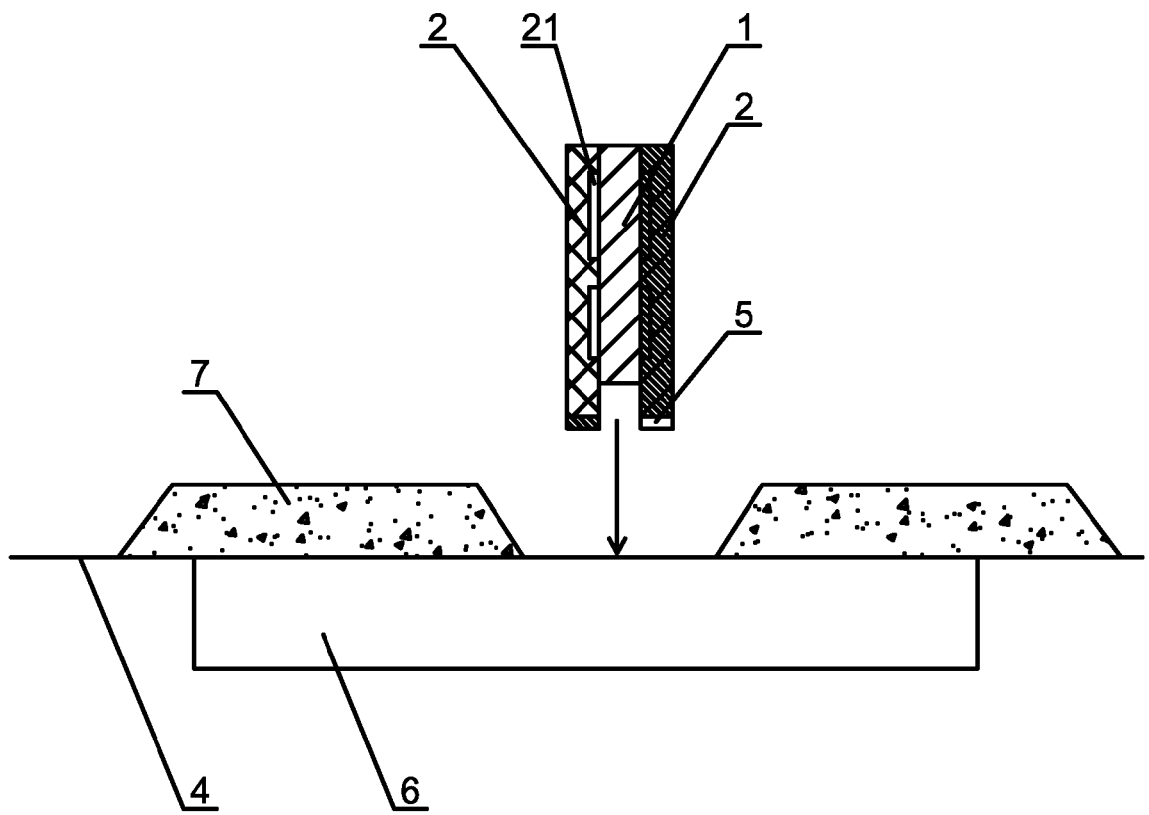
FIG. 4 is a structure diagram of a heat sealing device in accordance with another embodiment of the invention.
Figure 5:
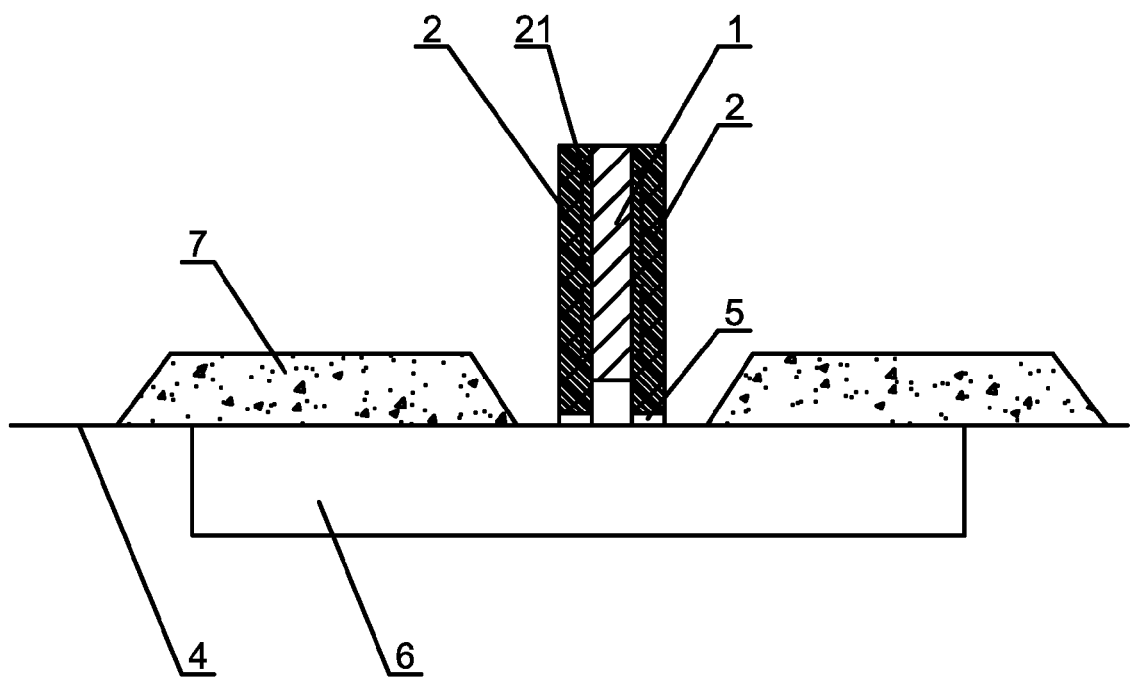
FIG. 5 is a structure diagram of contact between a positioning blocking element of a heat sealing device with a film in another embodiment.
Figure 6:
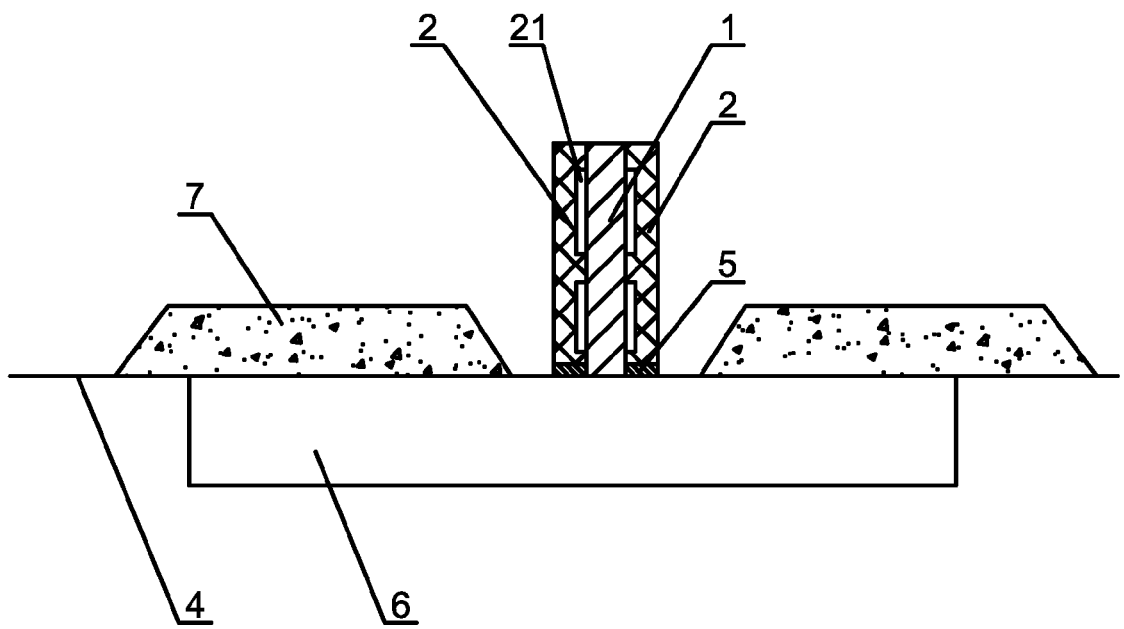
FIG. 6 is a structure diagram of a heat sealing cutting die of a heat sealing device during the heat sealing process in accordance with another embodiment of the invention.

As shown in FIG. 4, a heat sealing device employing a high-frequency heat sealing method is mainly used for multipack packaging. The heat sealing device comprises a heat sealing cutting die 1. The shape of the cross section of the heat sealing cutting die is consistent with the packaging line, flaky positioning blocking elements are fixed on two side surfaces of the heat sealing cutting die, and each positioning blocking element adopts the same material and structure as the high-temperature resistant silicon sheet 2 in Example 2. when the heat sealing cutting die of the heat sealing device of the embodiment performs heat sealing packaging to the films 4, packaging materials are put in a packaging cavity 7 formed by the two layers of upper and lower films 4, the films are transported to a heat sealing station 6, at the moment, the heat sealing device works, the heat sealing cutting die is lowered and adjacent to the films, as shown in FIG. 5, metal pressure sheets 5 on the high-temperature resistant silicon sheets closely attached to two sides of the heat sealing cutting die are first in contact with the films, the films are pressed and positioned in virtue of the elastic force generated during the compression deformation of the high-temperature resistant silicon sheets, the air flow between the packaging line and the packaging cavities on two sides of the packaging line is further blocked, then the heat sealing cutting die is in contact with the films (as shown in FIG. 6), the films are heated under the action of high-frequency electric field, and mutually bonded under the pressure of the heat sealing cutting die, the high-temperature resistant silicon sheets are closely attached to two sides of the heat sealing cutting die, thus the packaging cavity for allowing the packaging materials to be placed in is completely closed by the blocking press lines formed by the positioning blocking elements, the gas generated during the decomposition of the heated film in the packaging line is completely blocked by the high-temperature resistant silicon sheets on two sides and finally released from the surface of the film or two ends of the packaging line, and the secondary pollution to the packaging materials is further avoided.

Example 4

Figure 7:
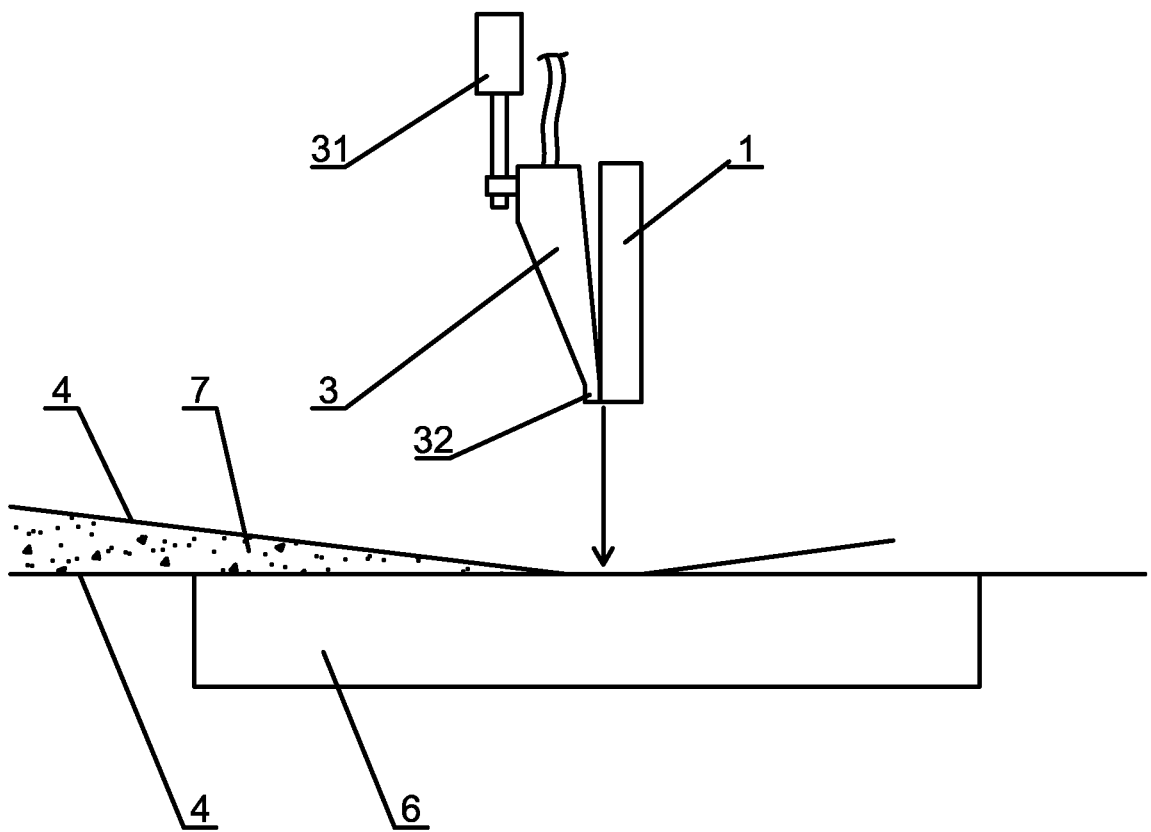
FIG. 7 is a structure diagram of a heat sealing device in accordance with still another embodiment of the invention.
Figure 8:
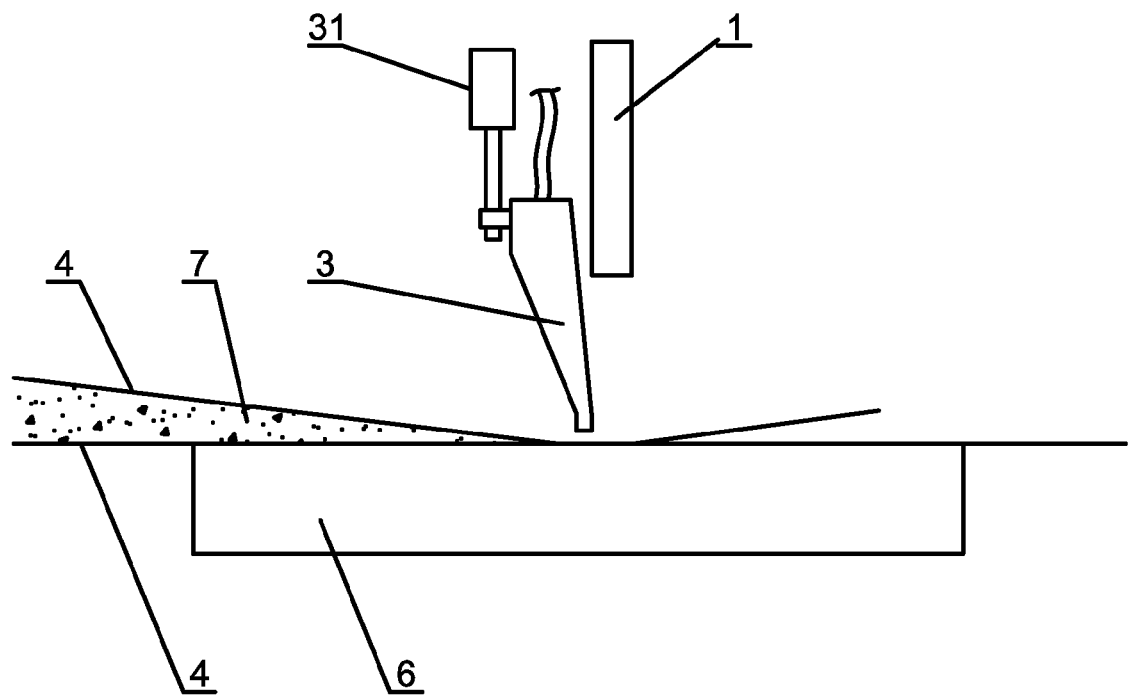
FIG. 8 is a structure diagram of contact between a positioning blocking element of a heat sealing device with a film in another embodiment.
Figure 9:
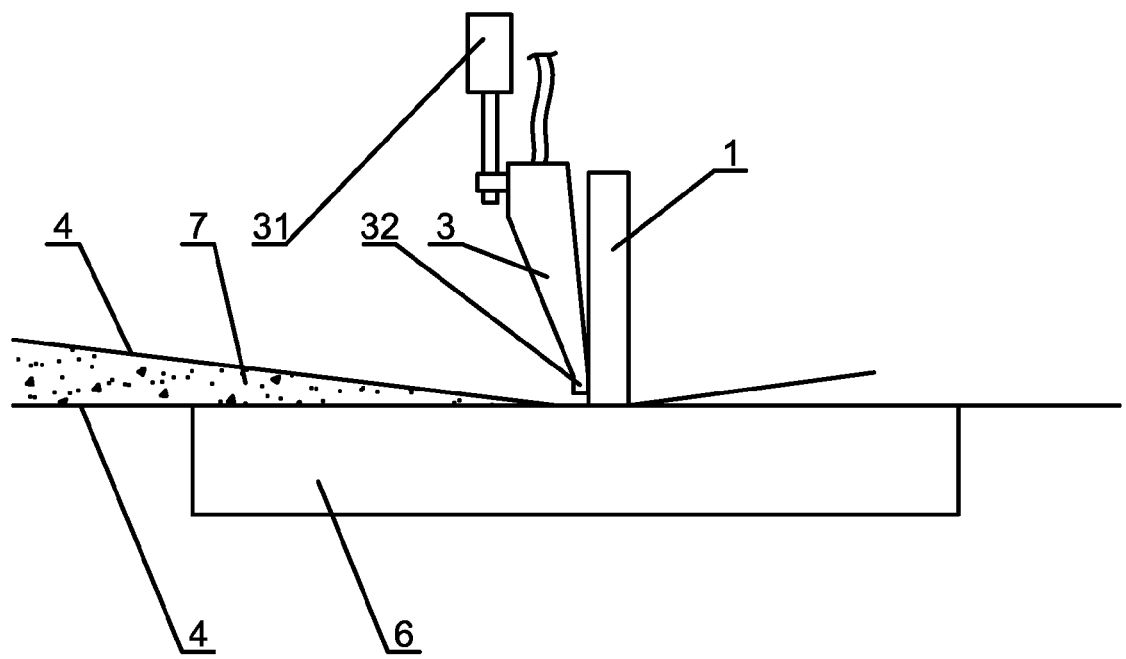
FIG. 9 is a structure diagram of a heat sealing cutting die of a heat sealing device during the heat sealing process in accordance with still another embodiment of the invention.

As shown in FIG. 7, a heat sealing device employing a thermo-melt bonding method is mainly used for individual packaging. The heat sealing device comprises a heat sealing cutting die 1 capable of moving vertically. A positioning blocking element is fixed on one side surface of the heat sealing cutting die and adopts a wedge-shaped spray nozzle 3 capable of spraying compressed air out, the wedge-shaped spray nozzle is favorable for reducing the flow resistance of compressed air as well as the working noise of the spray nozzle, an orifice of the spray nozzle is linear slit-shaped and 0.5 mm in width, meanwhile, a diversion section 32 with length of 2 mm is arranged at the orifice of the spray nozzle, an included angle is formed between one side surface of the spray nozzle adjacent to the heat sealing cutting die and the side surface of the heat sealing cutting die, so as to avoid the friction interference between the spray nozzle and the heat sealing cutting die, and the included angle generally ranges from 2° to 5°. A control mechanism for controlling the work of the spray nozzle comprises an air cylinder 31 connected with the rear end of the spray nozzle. The air cylinder drives the spray nozzle to move up and down, when the spray nozzle is positioned above, it's called starting position, when the spray nozzle moves below, it's called blocking position, and when the spray nozzle moves to the downward blocking position, the spray nozzle is 1 mm away from the film (as shown in FIG. 8). When the heat sealing cutting die of the heat sealing device of the embodiment performs heat sealing packaging to the film, packaging materials are put in a packaging cavity 7 formed by two layers of upper and lower films 4, the films are transported to a heat sealing station 6, at the moment, the heat sealing device works, the control mechanism first controls the air cylinder to push the spray nozzle to move downwards and stop at the position 1 mm away from the film and then controls the spray nozzle to spray out compressed air to the film, the films are pressed and positioned under the pressure of compressed air, the air flow between the packaging line and the packaging cavity is further blocked, then the heat sealing cutting die moved downward to be in contact with the film (refer to FIG. 9 for details), the heat sealing cutting die transfers heat to the packaging line of the films, the films are mutually bonded together after being molten by heat, the spray nozzle is arranged adjacent to the heat sealing cutting die, thus there is no gap between the two layers of films and on one side of the packaging line of the heat sealing cutting die adjacent to the packaging cavity, the temperature is always lower than the decomposition temperature of the film, thus the gas generated during the decomposition of the heated film is completely blocked on the side adjacent to the packaging cavity by the compressed air sprayed out through the spray nozzle, and finally released from the surface of the film or two ends of the packaging line, and it's also favorable for straightening and beautifying the packaging line formed after package, so as to improve the grade of the product. Optionally, the heat sealing device of the embodiment also can adopt a high-frequency heat sealing method, the high-frequency heat sealing method can be suitable for multipack packaging through the arrangement of spray nozzles on two sides of the heat sealing cutting die, and refer to Example 3 for its concrete operating principle and operating method.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A heat sealing device, comprising:
   a heat sealing cutting die; and
   a positioning blocking element;
   wherein:
   the positioning blocking element is arranged on a side surface of the heat sealing cutting die and is linked with the heat sealing cutting die;
   the positioning blocking element employs a high-temperature resistant silicon sheet;
   a lower end surface of the high-temperature resistant silicon sheet for pressing the film is higher than that of the heat sealing cutting die for heat sealing; and
   a metal pressure sheet is installed on the end surface of the high-temperature resistant silicon sheet for pressing the film.

2. The heat sealing device of claim 1, wherein
   a groove used for reducing the heat transfer between the heat sealing cutting die and the high-temperature resistant silicon sheet is formed on one side of the high-temperature resistant silicon sheet adjacent to the heat sealing cutting die; and
   the lower end surface of the high-temperature resistant silicon sheet is between 1 and 5 mm higher than that of the heat sealing cutting die.

3. The heat sealing device of claim 1, wherein the positioning blocking element is arranged on two side surfaces of the heat sealing cutting die.

4. A heat sealing device, comprising:
   a heat sealing cutting die; and
   a positioning blocking element;
   wherein:
   the positioning blocking element is arranged on a side surface of the heat sealing cutting die and is linked with the heat sealing cutting die;
   the positioning blocking element employs a high-temperature resistant silicon sheet;
   a lower end surface of the high-temperature resistant silicon sheet for pressing the film is higher than that of the heat sealing cutting die for heat sealing;
   a metal pressure sheet is installed on the end surface of the high-temperature resistant silicon sheet for pressing the film;
   a groove used for reducing the heat transfer between the heat sealing cutting die and the high-temperature resistant silicon sheet is formed on one side of the high-temperature resistant silicon sheet adjacent to the heat sealing cutting die; and the lower end surface of the high-temperature resistant silicon sheet is between 1 and 5 mm higher than that of the heat sealing cutting die.

5. A heat sealing device, comprising:
a heat sealing cutting die; and
a positioning blocking element;
wherein:
the positioning blocking element is arranged on a side surface of the heat sealing cutting die and is linked with the heat sealing cutting die;
the positioning blocking element employs a high-temperature resistant silicon sheet;
a lower end surface of the high-temperature resistant silicon sheet for pressing the film is higher than that of the heat sealing cutting die for heat sealing;
a metal pressure sheet is installed on the end surface of the high-temperature resistant silicon sheet for pressing the film; and
the positioning blocking element is arranged on two side surfaces of the heat sealing cutting die.

* * * * *